United States Patent
Jang

(10) Patent No.: US 10,050,571 B2
(45) Date of Patent: Aug. 14, 2018

(54) MOTOR DRIVING APPARTUS AND HOME APPLIANCE INCLUDING THE SAME

(71) Applicant: LG ELECTRONICS INC., Seoul (KR)

(72) Inventor: Minho Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 64 days.

(21) Appl. No.: 15/160,313

(22) Filed: May 20, 2016

(65) Prior Publication Data

US 2016/0344324 A1    Nov. 24, 2016

(30) Foreign Application Priority Data

May 21, 2015  (KR) .................. 10-2015-0071190

(51) Int. Cl.
*H02P 6/20* (2016.01)
*D06F 37/30* (2006.01)
(Continued)

(52) U.S. Cl.
CPC .............. *H02P 6/20* (2013.01); *D06F 37/304* (2013.01); *H02P 6/18* (2013.01); *H02P 21/14* (2013.01)

(58) Field of Classification Search
CPC .... H02P 6/20; H02P 6/205; H02P 6/22; H02P 6/182; H02P 6/16
(Continued)

(56) References Cited

U.S. PATENT DOCUMENTS

2013/0009586 A1* 1/2013 Chen ................. H02P 21/04
                                                            318/504
2014/0101865 A1* 4/2014 Jang .................. D06F 37/304
                                                            8/137
(Continued)

FOREIGN PATENT DOCUMENTS

CN       104158459      11/2014
EP       1 753 125       2/2007
(Continued)

OTHER PUBLICATIONS

European Search Report dated Oct. 18, 2016 issued in Application No. 16170637.9.
(Continued)

*Primary Examiner* — Kawing Chan
*Assistant Examiner* — Bradley Brown
(74) *Attorney, Agent, or Firm* — KED & Associates, LLP

(57) ABSTRACT

A motor driving apparatus includes an inverter to convert a direct current (DC) voltage into an alternating current (AC) voltage through a switching operation and to output the AC voltage to a motor, an output current detector to detect an output current flowing in the motor, and a controller to control the inverter, wherein, at the time of starting the motor, the controller controls a first current, including a DC component and a high-frequency component, to be supplied to the motor during a first period for alignment of the motor, and controls a second current, including a DC component and a high-frequency component, to be supplied to the motor during a second period for alignment of the motor, and the controller calculates the stator resistance and inductance of the motor based on the first current and the second current. Consequently, it is possible to easily calculate the stator resistance and inductance of the motor during the alignment of the motor.

18 Claims, 12 Drawing Sheets

(51) Int. Cl.
*H02P 6/18* (2016.01)
*H02P 21/14* (2016.01)

(58) Field of Classification Search
USPC .................................................. 318/400.11
See application file for complete search history.

(56) References Cited

U.S. PATENT DOCUMENTS

2014/0300309 A1* 10/2014 Yoo .................... H02P 21/0017
318/801
2016/0011009 A1* 1/2016 Shimizu ............. G01R 19/0092
702/150

FOREIGN PATENT DOCUMENTS

| | | | | |
|---|---|---|---|---|
| EP | 2448110 | 5/2012 | | |
| JP | 2012100369 A | * 5/2012 | ............... | H02P 21/16 |
| KR | 10-2009-0067919 | 6/2009 | | |
| KR | 10-1196028 | 10/2012 | | |
| KR | 10-2014-0045713 | 4/2014 | | |
| KR | 10-2014-0045714 | 4/2014 | | |

OTHER PUBLICATIONS

Korean Notice of Allowance dated Dec. 26, 2016 issued in Application No. 10-2015-0071190.
Korean Office Action dated Jun. 20, 2016.

* cited by examiner

MOTOR DRIVING APPARTUS AND HOME APPLIANCE INCLUDING THE SAME

CROSS-REFERENCE TO RELATED APPLICATION(S)

This application claims the priority benefit of Korean Patent Application No. 10-2015-0071190, filed on 21 May 2015, in the Korean Intellectual Property Office, the disclosure of which is incorporated herein by reference in its entirety.

BACKGROUND

1. Field

A motor driving apparatus and a home appliance including the same, and a motor driving apparatus that is capable of easily calculating the stator resistance and inductance of a motor during the alignment of the motor and a home appliance including the same are disclosed herein.

2. Background

A motor driving apparatus, which is configured to drive a motor, may include a rotor, which performs a rotary motion, and stators, each of which has a coil wound therearound. The motor driving apparatus may be classified as a sensor type motor driving apparatus, which uses a sensor, or a sensorless type motor driving apparatus, which uses no sensor. The sensorless type motor driving apparatus has been commonly used for the purpose of reducing manufacturing cost. For this reason, much research has been conducted into a sensorless type motor driving apparatus that is capable of efficiently driving a motor.

BRIEF DESCRIPTION OF THE DRAWINGS

The embodiments will be described in detail with reference to the following drawings in which like reference numerals refer to like elements, and wherein.

DETAILED DESCRIPTION

A motor driving apparatus described in this specification may be a motor driving apparatus that is capable of estimating the position of a rotor of a motor without the provision of a position sensing unit, such as a hall sensor, for sensing the position of the rotor of the motor, i.e. in a sensorless mode. Hereinafter, a sensorless motor driving apparatus will be described.

Figure 1:
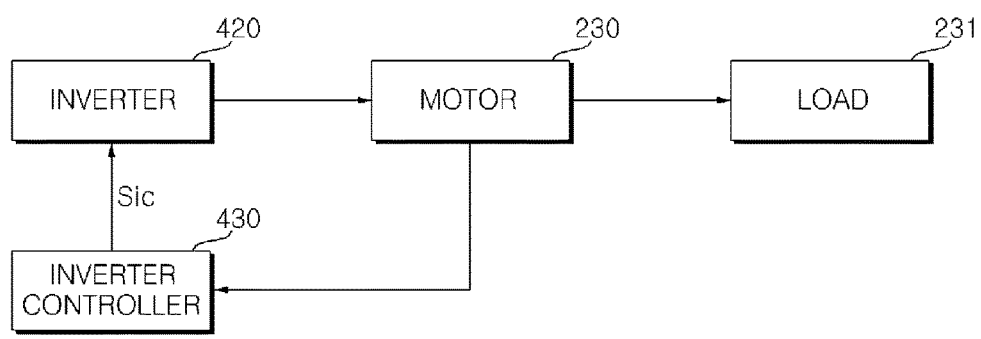
FIG. 1 is an internal block diagram of a motor driving apparatus according to an embodiment.
Figure 2:
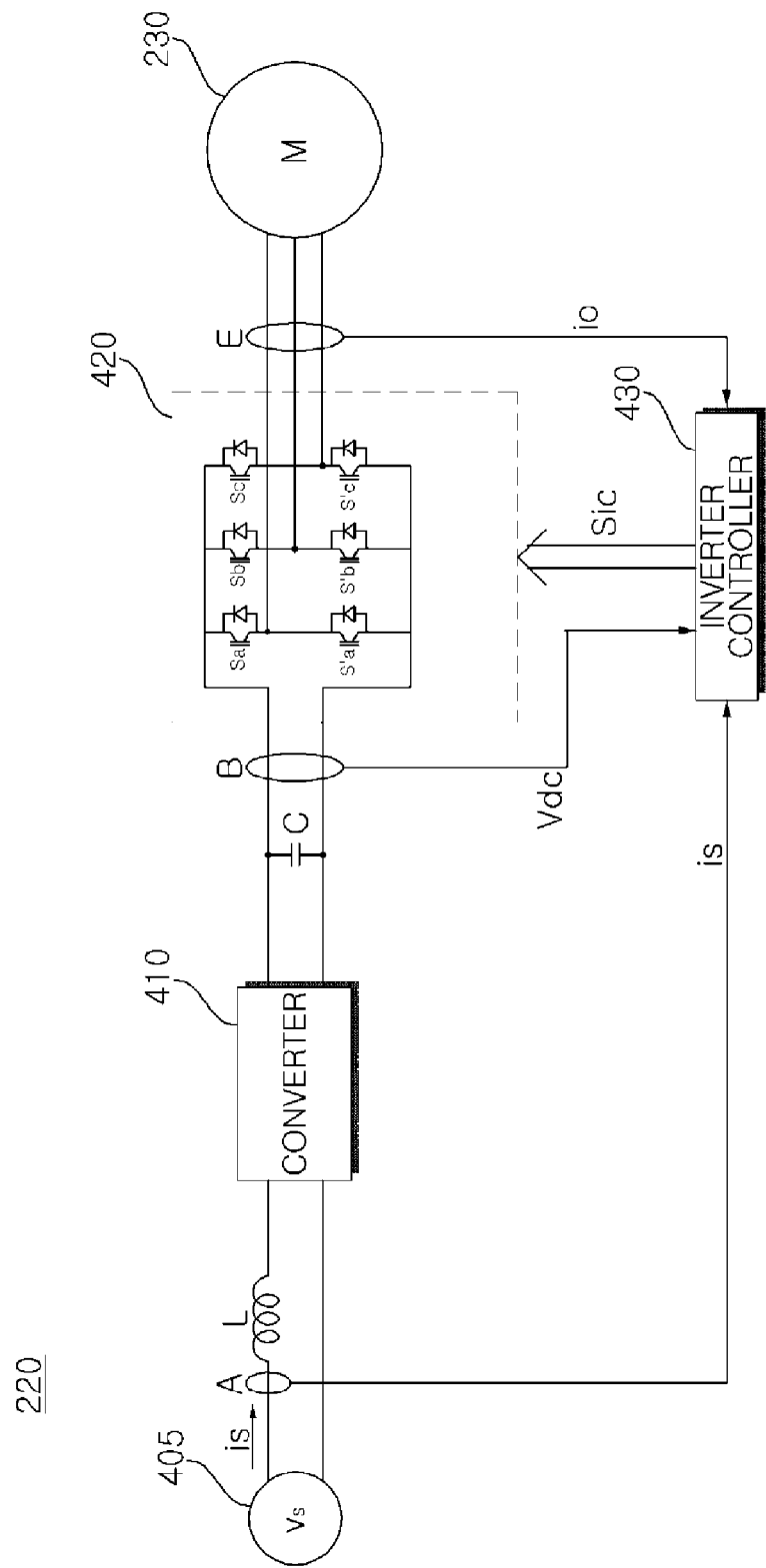
FIG. 2 is an internal circuit diagram of the motor driving apparatus of FIG. 1.

Referring to FIGS. 1 and 2, a motor driving apparatus 220, which is configured to drive a motor in a sensorless mode, may include an inverter 420 and an inverter controller 430. The motor driving apparatus 220 may further include a converter 410, a direct current (DC) terminal voltage detection unit (or DC terminal voltage detector) B, a smoothing capacitor C, and an output current detection unit (or output current detector) E. The motor driving apparatus 220 may further include an input current detection unit (or input current detector) A and a reactor L.

At the time of starting the motor 230, the inverter controller 430 may control a first current, including a DC component and a high-frequency component, to be supplied to the motor 230 during a first period for alignment of the motor 230, may control a second current, including a DC component and a high-frequency component, to be supplied to the motor 230 during a second period for alignment of the motor 230, and may calculate the stator resistance and inductance of the motor 230 based on the first current and the second current. Consequently, it may be possible to easily calculate the stator resistance and inductance of the motor 230 during the alignment of the motor 230.

Current including a DC component and a high-frequency component may be supplied as an alignment current. At the time of starting the motor 230, therefore, it is possible to easily calculate the stator resistance and inductance of the motor 230 together with alignment of the motor 230.

The inverter controller 430 may control a first current, including a first flux current, which includes a DC component and a high-frequency component, based on a stationary coordinate system, and a first torque current, which includes a high-frequency component, based on the stationary coordinate system, to be supplied to the motor 230 during the first period. The inverter controller 430 may also control a second current, including a second flux current, which includes a DC component and a high-frequency component, based on the stationary coordinate system, and a second torque current, which includes a high-frequency component, based on the stationary coordinate system, to be supplied to the motor 230 during the second period.

The inverter controller 430 may control the magnitude of the second flux current to be higher than the magnitude of the first flux current by an integer ratio, and may control the magnitude of the second torque current to be higher than the magnitude of the first torque current by an integer ratio. The inverter controller 430 may also calculate the stator resistance of the motor 230 based on values obtained by removing the high-frequency components from the first current and the second current, and may calculate the inductance of the motor 230 based on values obtained by removing the DC components from the first current and the second current.

The inverter controller 430 may further calculate the stator resistance of the motor 230 based on a current reference value and a voltage reference value of the first current and a current reference value and a voltage reference value of the second current based on the stationary coordinate system, and may calculate the inductance of the motor 230 based on a current reference value and a voltage reference value of the first current and a current reference value and a voltage reference value of the second current based on a rotating coordinate system (a synchronous coordinate system). The inverter controller 430 may calculate the magnitude of load based on the stator resistance of the motor 230 during a normal operation of the motor 230 after starting of the motor 230, and may generate a speed reference value based on the calculated magnitude of the load.

The reactor L may be provided between a commercial alternating current (AC) voltage source 405 ($V_s$) and the converter 410 to perform a power factor correction or boosting operation. In addition, the reactor L may function to restrict a harmonic current due to high-speed switching of the converter 410.

The input current detection unit A may detect an input current $i_s$ input from the commercial AC voltage source 405. A current transformer (CT) or a shunt resistor may be used as the input current detection unit A. The detected input current $i_s$, which is a pulse type discrete signal, may be input to the inverter controller 430.

The converter 410 may convert voltage, having been output from the commercial AC voltage source 405 and passed through the reactor L, into a DC voltage and output the converted DC voltage. The commercial AC voltage source 405 may be a single phase AC voltage source, as shown in the figure. The commercial AC voltage source 405 may also be a three phase AC voltage source. The internal structure of the converter 410 may be modified based on the type of the commercial AC voltage source 405.

The converter 410 may include only diodes without a switching device. In this case, the converter 410 may perform a rectification operation without an additional switching operation. Four diodes may be arranged in the shape of a bridge for the single phase AC voltage source, and six diodes may be arranged in the shape of a bridge for the three phase AC voltage source.

A half-bridge type converter including two switching devices and four diodes connected to the switching devices may be used as the converter 410. Alternatively, six switching devices and six diodes may be used for the three phase AC voltage source. In a case in which the converter 410 includes a switching device, boosting, power factor improvement, and DC voltage conversion may be performed according to a switching operation of the switching device.

The smoothing capacitor C may smooth input voltage and store the smoothed voltage. Although one smoothing capacitor C is shown in the figure, a plurality of smoothing capacitors C may be provided to secure device stability.

The smoothing capacitor C may be connected to the output terminal of the converter 410, as shown in the figure. A DC voltage may also be directly input to the smoothing capacitor C. Specifically, a DC voltage from a solar cell may be directly input to the smoothing capacitor C, or may be DC/DC converted and then input to the smoothing capacitor C.

Both terminals of the smoothing capacitor C may be referred to as DC terminals or DC link terminals since DC voltage is stored in the smoothing capacitor C. The DC terminal voltage detection unit B may detect a DC terminal voltage $V_{dc}$ applied between both terminals of the smoothing capacitor C. The DC terminal voltage detection unit B may include a resistor and an amplifier. The detected DC terminal voltage $V_{dc}$, which may be a pulse type discrete signal, may be input to the inverter controller 430.

The inverter 420 may include a plurality of inverter switching devices. The inverter 420 may convert the smoothed DC terminal voltage $V_{dc}$ into three phase AC voltages $V_a$, $V_b$, and $V_c$ of predetermined frequencies according to on/off operations of the switching devices, and may then output the converted three phase AC voltages $V_a$, $V_b$, and $V_c$ to the motor 230 as a three phase synchronous motor.

In the inverter 420, upper arm switching devices Sa, Sb, and Sc and lower arm switching devices S'a, S'b, and S'c may be connected in series to each other in pairs. As a result, three pairs of upper and lower arm switching devices Sa & S'a, Sb & S'b, and Sc & S'c may be connected in parallel to one another. A diode may be connected in reverse parallel to each of the switching devices Sa, S'a, Sb, S'b, Sc, and S'c.

The switching devices of the inverter 420 may be turned on/off in response to an inverter switching control signal $S_{ic}$ from the inverter controller 430. As a result, three phase AC voltages of predetermined frequencies may be output to the three phase synchronous motor 230.

The inverter controller 430 may control the switching operation of the inverter 420 in a sensorless mode. The inverter controller 430 may receive an output current $i_o$ detected by the output current detection unit E.

The inverter controller 430 may output the inverter switching control signal $S_{ic}$ to the inverter 420 to control the switching operation of the inverter 420. The inverter switching control signal $S_{ic}$, which may be a pulse width modulation (PWM)-based switching control signal, may be generated and output based on the output current $i_o$, detected by the output current detection unit E. The output of the inverter switching control signal $S_{ic}$ from the inverter controller 430 will be described hereinafter in detail with reference to FIG. 3.

The output current detection unit E may detect the output current $i_o$ flowing between the inverter 420 and the three phase synchronous motor 230. The output current detection unit E may detect current flowing in the motor 230. The output current detection unit E may detect all three phase output currents $i_a$, $i_b$, and $i_c$. Alternatively, the output current detection unit E may detect two phase output currents using three phase equilibrium.

The output current detection unit E may be located between the inverter 420 and the motor 230. In order to detect current, a current transformer (CT) or a shunt resistor may be used as the output current detection unit E.

In a case in which a plurality of shunt resistors is used, three shunt resistors may be located between the inverter 420 and the synchronous motor 230, or one end of each of three shunt resistors may be connected to a corresponding one of the three lower arm switching devices S'a, S'b, and S'c of the inverter 420. Alternatively, two shunt resistors may be used based on three phase equilibrium. In a case in which one shunt resistor is used, on the other hand, the shunt resistor may be provided between the capacitor C and the inverter 420.

The detected output current $i_o$, which is a pulse type discrete signal, may be supplied to the inverter controller 430. The inverter switching control signal $S_{ic}$ may be generated based on the detected output current $i_o$. In the following description, the detected output current $i_o$ may correspond to three phase output currents $i_a$, $i_b$, and $i_c$.

Meanwhile, the three phase synchronous motor 230 may include stators and a rotor. All three phase AC voltages of predetermined frequencies are applied to coils of all three phase (a-phase, b-phase, and c-phase) stators in order to rotate the rotor.

The motor 230 may include a Surface-Mounted Permanent-Magnet Synchronous Motor (SMPMSM), an Interior Permanent Magnet Synchronous Motor (IPMSM), and a Synchronous Reluctance Motor (SynRM). The SMPMSM and the IPMSM are Permanent Magnet Synchronous Motors (PMSM) each having a permanent magnet, whereas the SynRM is a motor having no permanent magnet.

Figure 3:
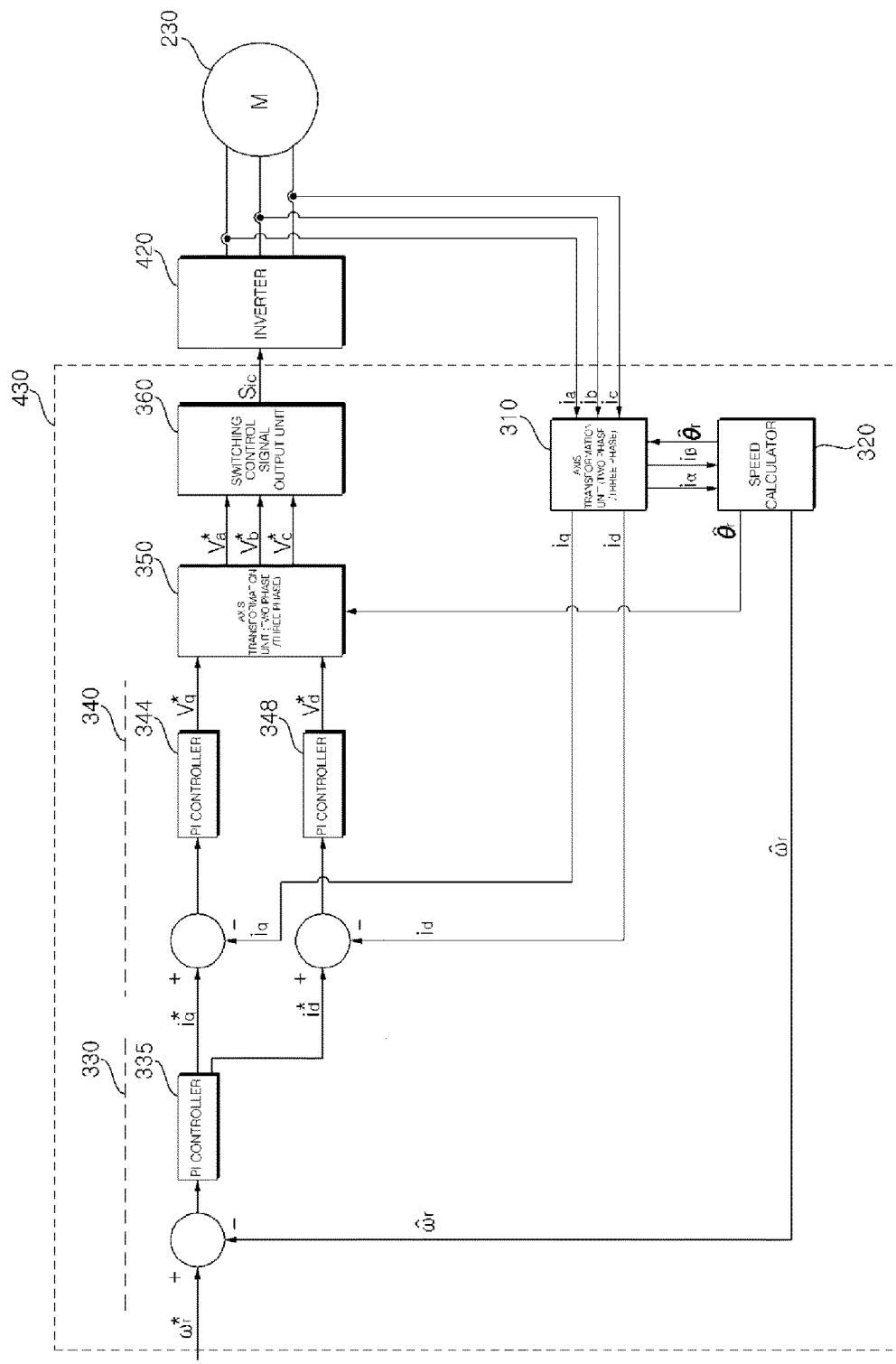
FIG. 3 is an internal block diagram of an inverter controller shown in FIG. 2.

Referring to FIG. 3, the inverter controller 430 may include an axis transformation unit (or axis transformer) 310, a speed calculation unit (or speed calculator) 320, a current reference generation unit (or current reference generator) 330, a voltage reference generation unit (or voltage reference generator) 340, an axis transformation unit (or axis transformer) 350, and a switching control signal output unit (or switching signal output device) 360. The axis transformation unit 310 may receive the three phase output currents $i_a$, $i_b$, and $i_c$ detected by the output current detection unit E, and transform the received output currents $i_a$, $i_b$, and $i_c$ into two phase currents $i_\alpha$ and $i_\beta$ of the stationary coordinate system.

The axis transformation unit 310 may transform the two phase currents $i_\alpha$ and $i_\beta$ of the stationary coordinate system into two phase currents $i_d$ and $i_q$ of the rotating coordinate system. The speed calculation unit 320 may output a position $\hat{\theta}_r$ and speed $\hat{\omega}_r$ calculated based on the two phase currents $i_\alpha$ and $i_\beta$ of the stationary coordinate system, axis-transformed by the axis transformation unit 310.

The current reference generation unit 330 may generate a current reference value $i^*_q$ based on the calculated speed $\hat{\omega}_r$ and a speed reference value $\omega^*_r$. A PI controller 335 of the current reference generation unit 330 may perform PI control based on the difference between the calculated speed $\omega^*_r$ and the speed reference value $\omega^*_r$ to generate a current reference value $i^*_q$. Although a q-axis current reference value $i^*_q$ is shown as the current reference value in the figure, it is possible to generate a d-axis current reference value $i^*_d$ together with the q-axis current reference value $i^*_q$. The d-axis current reference value $i^*_d$ may be set to 0. The current reference generation unit 330 may further include a limiter to limit the level of the current reference value $i^*_q$ such that the current reference value $i^*_q$ does not exceed an allowable range.

The voltage reference generation unit 340 may generate d-axis and q-axis voltage reference values $V^*_d$ and $V^*_q$ based on d-axis and q-axis currents $i_d$ and $i_q$ axis-transformed into a two phase rotating coordinate system by the axis transformation unit and the current reference values $i^*_d$ and $i^*_q$ generated by the current reference generation unit 330. A PI controller 344 of the voltage reference generation unit 340 may perform PI control based on the difference between the q-axis current $i_q$ and the q-axis current reference value $i^*_q$ to generate a q-axis voltage reference value $V^*_q$. In addition, a PI controller 348 of the voltage reference generation unit 340 may perform PI control based on the difference between the d-axis current $i_d$ and the d-axis current reference value $i^*_d$ to generate a d-axis voltage reference value $V^*_d$.

The voltage reference generation unit 340 may further include a limiter to limit levels of the d-axis and q-axis voltage reference values $V^*_d$ and $V^*_q$ such that the d-axis and q-axis voltage reference values $V^*_d$ and $V^*_q$ do not exceed allowable ranges. The generated d-axis and q-axis voltage reference values $V^*_d$ and $V^*_q$ may be input to the axis transformation unit 350.

The axis transformation unit 350 may receive the calculated position $\hat{\theta}_r$ and the d-axis and q-axis voltage reference values $V^*_d$ and $V^*_q$ from the estimation unit 320 to perform axis transformation. The axis transformation unit 350 may perform transformation from a two phase rotating coordinate system to a two phase stationary coordinate system. At this time, the position $\hat{\theta}_r$ calculated by the estimation unit 320, may be used.

Subsequently, the axis transformation unit 350 may perform transformation from the two phase stationary coordinate system to a three phase stationary coordinate system. As a result, the axis transformation unit 350 may output three phase output voltage reference values V*a, V*b, and V*c.

The switching control signal output unit 360 may generate and output a PWM-based inverter switching control signal $S_{ic}$ based on the three phase output voltage reference values V*a, V*b, and V*c. The output inverter switching control signal $S_{ic}$ may be converted into a gate driving signal by a gate driving unit, and may then be input to a gate of each switching device of the inverter 420. As a result, the respective switching devices Sa, S'a, Sb, S'b, Sc, and S'c of the inverter 420 may perform switching operations.

Meanwhile, the inverter controller 430 may control a first current, including a DC component and a high-frequency component, to be supplied to the motor 230 during a first period for alignment of the motor 230, and may control a second current, including a DC component and a high-frequency component, to be supplied to the motor 230 during a second period for alignment of the motor 230. The current reference generation unit 330 of the inverter controller 430 may generate a first flux current reference value, including a DC component and a high-frequency component, based on the stationary coordinate system and a first torque current reference value, including a high-frequency component, based on the stationary coordinate system, during the first period.

The inverter controller 430 may output a switching control signal based on the first flux current reference value and the first torque current reference value based on the stationary coordinate system. Consequently, the first current may flow in the motor 250 during the first period.

The current reference generation unit 330 of the inverter controller 430 may generate a second flux current reference value, including a DC component and a high-frequency component, based on the stationary coordinate system and a second torque current reference value, including a high-frequency component, based on the stationary coordinate system, during the second period. The inverter controller 430 may output a switching control signal based on the second flux current reference value and the second torque current reference value based on the stationary coordinate system. Consequently, the second current may flow in the motor 250 during the second period.

The current reference generation unit 330 of the inverter controller 430 may control the magnitude of the second flux current reference value to be higher than the magnitude of the first flux current reference value by an integer ratio. The current reference generation unit 330 of the inverter controller 430 may control the magnitude of the second torque current reference value to be higher than the magnitude of the first torque current reference value by an integer ratio.

The inverter controller 430 may calculate the stator resistance of the motor 230 based on the DC components obtained by removing the high-frequency components from the first current and the second current, and may calculate the inductance of the motor 230 based on the high-frequency components obtained by removing the DC components from the first current and the second current. Specifically, the inverter controller 430 may calculate the stator resistance of the motor 230 based on a current reference value and a voltage reference value of the first current and a current reference value and a voltage reference value of the second current based on the stationary coordinate system, and may calculate the inductance of the motor 230 based on a current reference value and a voltage reference value of the first current and a current reference value and a voltage reference value of the second current based on the rotating coordinate system (the synchronous coordinate system).

The inverter controller 430 may generate and output a switching control signal such that the speed of the motor is increased during an acceleration period after alignment of the motor 230, and may generate and output a switching control signal such that the speed of the motor is varied during a normal operation period after the acceleration period. The inverter controller 430 may also calculate the magnitude of a load based on the stator resistance of the motor 230 during a normal operation of the motor 230 after starting of the motor 230, and may generate a speed reference value $\omega^*_r$ based on the calculated magnitude of the load.

Figure 4:
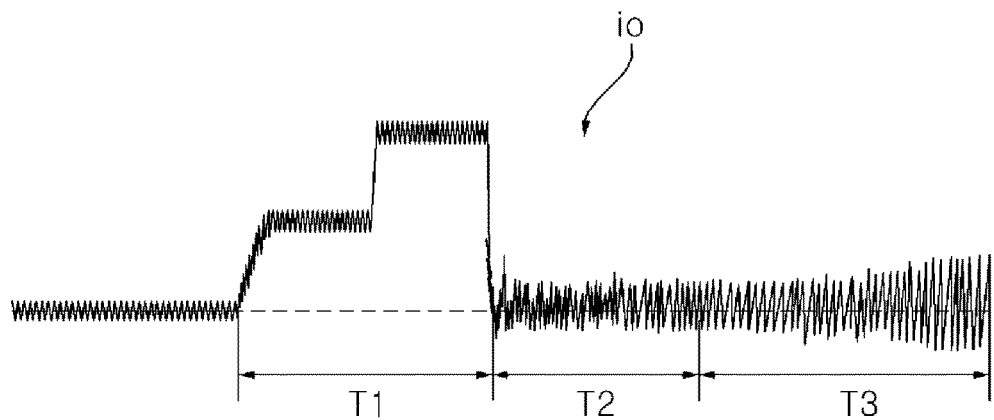
FIG. 4 is waveform of output current supplied to a motor shown in FIG. 1.

Referring to FIG. 4, the motor 230 may be driven over a motor alignment period T1 for aligning the motor 230 at the time of starting the motor 230, a motor acceleration period T2 for accelerating the motor 230, and a normal operation period T3 for varying the speed of the motor 230 based on the load. A stator resistance value Rs and an inductance value Ls of the motor 230 may be calculated during the motor alignment period T1.

Figure 5:
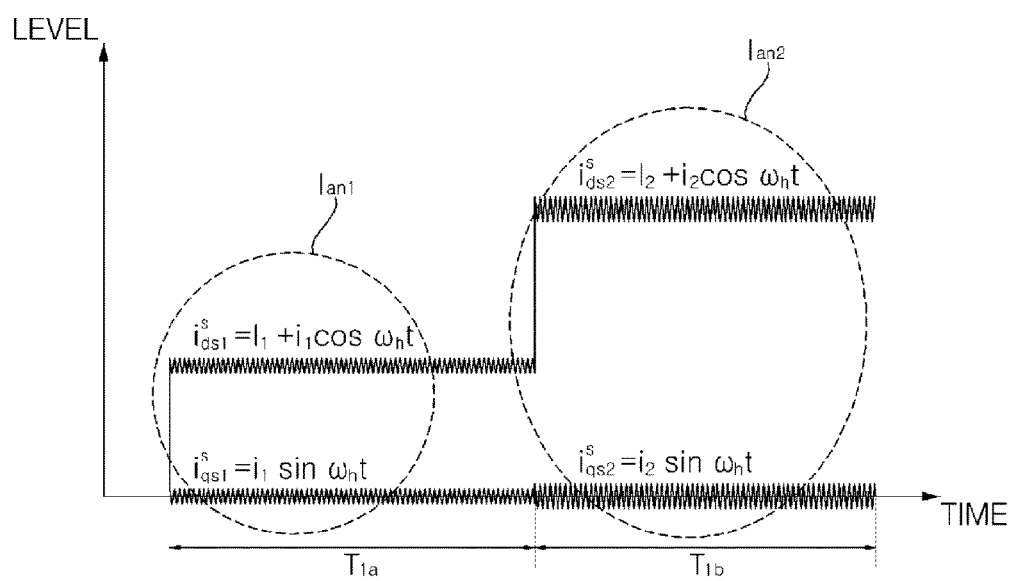
FIG. 5 is a detailed view showing the waveform of output current that is supplied during a motor alignment period shown in FIG. 4.

Referring to FIG. 5, the motor alignment period T1 may be divided into a first period $T_{1a}$, during which a first current $I_{an1}$, including a DC component and a high-frequency component, is supplied to the motor 230, and a second period $T_{1b}$, during which a second current $I_{an2}$, including a DC component and a high-frequency component, is supplied to the motor 230. The first current $I_{an1}$ may be current corresponding to a first flux current reference value $i_{ds1}^s$, including a DC component and a high-frequency component, based on the stationary coordinate system, and a first torque current reference value $i_{qs1}^s$, including a high-frequency component, based on the stationary coordinate system. Equation 1 illustrates the first flux current reference value $i_{ds1}^s$ based on the stationary coordinate system.

$$i_{ds1}^s = I_1 + i_1 \cos \omega_h t \quad \text{[Equation 1]}$$

The first flux current reference value $i_{ds1}^s$ may include a DC component $I_1$ and a high-frequency component $i_1 \cos \omega_h t$. Equation 2 illustrates the first torque current reference value $i_{qs1}^s$ based on the stationary coordinate system.

$$i_{qs1}^s = i_1 \sin \omega_h t \quad \text{[Equation 2]}$$

The first torque current reference value $i_{qs1}^s$ based on the stationary coordinate system may include a high-frequency component $i_1 \sin \omega_h t$. The second current $I_{an2}$ may correspond to a second flux current reference value $i_{ds2}^s$, including a DC component and a high-frequency component, based on the stationary coordinate system, and a second torque current reference value $i_{qs2}^s$, including a high-frequency component, based on the stationary coordinate system. Equation 3 illustrates the second flux current reference value $i_{ds2}^s$ based on the stationary coordinate system.

$$i_{ds2}^s = I_2 + i_2 \cos \omega_h t \quad \text{[Equation 3]}$$

The second flux current reference value $i_{ds2}^s$ may include a DC component $I_2$ and a high-frequency component $i_2 \cos \omega_h t$. Equation 4 illustrates the second torque current reference value $i_{qs2}^s$ based on the stationary coordinate system.

$$i_{qs2}^s = i_2 \sin \omega_h t \quad \text{[Equation 4]}$$

The second torque current reference value $i_{qs2}^s$ based on the stationary coordinate system may include a high-frequency component $i_2 \sin \omega_h t$. The magnitude of the second current may be higher than the magnitude of the first current by an integer ratio. Specifically, the magnitude of the DC component $I_2$ of the second flux current reference value $i_{ds2}^s$ may be higher than the magnitude of the DC component of the first flux current reference value $i_{ds1}^s$ by an integer ratio.

The magnitude of the second torque current reference value $i_{qs2}^s$ may be higher than the magnitude of the first torque current reference value $i_{qs1}^s$ by an integer ratio. The inverter controller 430 may calculate the stator resistance Rs and the inductance Ls of the motor 230 based on the first current $I_{an1}$ and the second current $I_{an2}$ during the motor alignment period T1.

The inverter controller 430 may remove the high-frequency components from the first current $I_{an1}$ and the second current $I_{an2}$, and may calculate the stator resistance value Rs of the motor 230 using the DC components of the first current $I_{an1}$ and the second current $I_{an2}$. The stator resistance value Rs of the motor 230 may be calculated using Equation 5 below.

$$R_s = \frac{\int_{\theta_h=\omega_h t_2}^{\theta_h=\omega_h t_2 + 2k\pi} v_{ds2}^s \, d\theta_h - \int_{\theta_h=\omega_h t_1}^{\theta_h=\omega_h t_1 + 2k\pi} v_{ds1}^s \, d\theta_h}{\int_{\theta_h=\omega_h t_2}^{\theta_h=\omega_h t_2 + 2k\pi} i_{ds2}^s \, d\theta_h - \int_{\theta_h=\omega_h t_1}^{\theta_h=\omega_h t_1 + 2k\pi} i_{ds1}^s \, d\theta_h} \quad \text{[Equation 5]}$$

The inverter controller 430 may subtract a value obtained by periodically integrating the first flux current reference value $i_{ds1}^s$ based on the stationary coordinate system from a value obtained by periodically integrating the second flux current reference value $i_{ds2}^s$ based on the stationary coordinate system. As a result, the high-frequency components may be removed.

The inverter controller 430 may subtract a value obtained by integrating a first flux voltage reference value based on the stationary coordinate system from a value obtained by integrating a second flux voltage reference value based on the stationary coordinate system. As a result, the high-frequency components may be removed.

The inverter controller 430 may divide the difference between the voltage reference values, from which the high-frequency components have been removed, by the difference between the current reference values, from which the high-frequency components have been removed. As a result, the stator resistance value Rs of the motor 230 may be calculated.

The inverter controller 430 may remove the DC components from the first current $I_{an1}$ and the second current $I_{an2}$, and may calculate the inductance value Ls of the motor 230 using the high-frequency components of the first current $I_{an1}$ and the second current $I_{an2}$. Specifically, the inverter controller 430 may calculate the inductance value Ls of the motor 230 based on the current reference value and the voltage reference value of the first current and the current reference value and the voltage reference value of the second current based on the rotating coordinate system. The inductance value Ls of the motor 230 may be calculated using Equation 6 below.

$$L_s = \frac{\int_{\theta_h=\omega_h t_2}^{\theta_h=\omega_h t_2 + 2k\pi} v_{qs2}^h \, d\theta_h - \int_{\theta_h=\omega_h t_1}^{\theta_h=\omega_h t_1 + 2k\pi} v_{qs1}^h \, d\theta_h}{\omega_h \cdot \left( \int_{\theta_h=\omega_h t_2}^{\theta_h=\omega_h t_2 + 2k\pi} i_{ds2}^h \, d\theta_h - \int_{\theta_h=\omega_h t_1}^{\theta_h=\omega_h t_1 + 2k\pi} i_{ds1}^h \, d\theta_h \right)} \quad \text{[Equation 6]}$$

The inverter controller 430 may convert the second flux current reference value $i_{ds2}^s$ based on the stationary coordinate system and the first flux current reference value $i_{ds1}^s$ based on the stationary coordinate system into a second flux current reference value $i_{ds2}^h$ based on the rotating coordinate system and a first flux current reference value $i_{ds1}^h$ based on the rotating coordinate system. The inverter controller 430 may subtract a value obtained by periodically integrating the first flux current reference value $i_{ds1}^h$ based on the rotating coordinate system from a value obtained by periodically integrating the second flux current reference value $i_{ds2}^h$ based on the rotating coordinate system. As a result, the DC components may be removed.

The inverter controller 430 may subtract a value obtained by integrating a first flux voltage reference value based on the rotating coordinate system from a value obtained by integrating a second flux voltage reference value based on the rotating coordinate system. As a result, the DC components may be removed.

The inverter controller 430 may divide the difference between the voltage reference values, from which the DC components have been removed, by the difference between the current reference values, from which the high-frequency components have been removed, and the frequency components. As a result, the inductance value Ls of the motor 230 may be calculated.

As described above, the currents including the DC components and the high-frequency components may be supplied to the motor 230 as alignment currents. Consequently, it may be possible to easily calculate the stator resistance and the inductance of the motor together with alignment of the motor 230 at the time of starting the motor 230.

The inverter controller 430 may calculate the magnitude of a load based on the stator resistance of the motor 230 during a normal operation of the motor 230 after starting of the motor 230, and may generate a speed reference value based on the calculated magnitude of the load. As a result, it may be possible to efficiently drive the motor 230.

Figure 6:
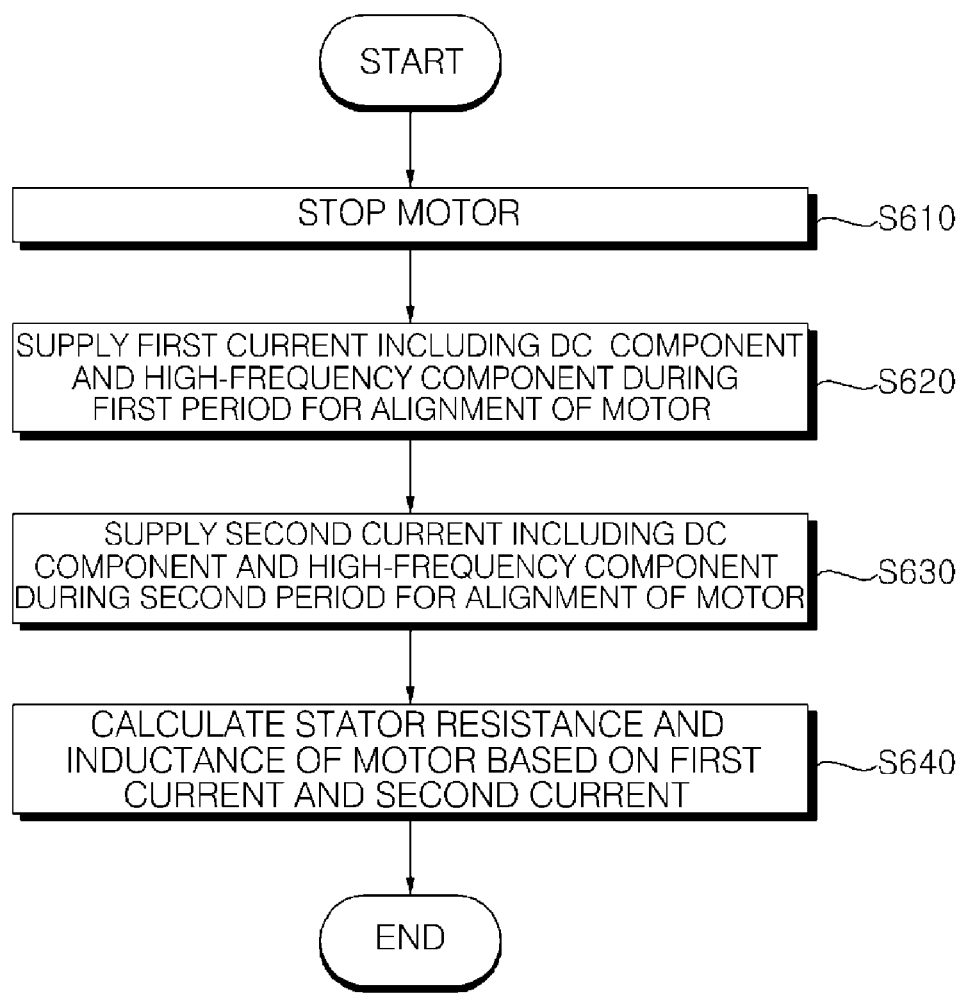
FIG. 6 is a flowchart showing an operating method of the motor driving apparatus according to the embodiment.

Referring to FIG. 6, the inverter controller 430 of the motor driving apparatus 220 may control the motor 230 to be stopped when it is not necessary to drive the motor 230 (S610). Subsequently, the inverter controller 430 may control the motor 230 to be aligned at the time of starting the motor 230.

The inverter controller 430 may control a first current $I_{an1}$, including a DC component and a high-frequency component, to be supplied to the motor 230 during the first period $T_{1a}$ of the motor alignment period T1 of FIG. 4 (S620). As described with reference to FIG. 4 and Equations 1 and 2, the first current $I_{an1}$ may be current corresponding to a first flux current reference value $i_{ds1}^s$, including a DC component and a high-frequency component, based on the stationary coordinate system and a first torque current reference value $i_{qs1}^s$, including a high-frequency component, based on the stationary coordinate system.

The inverter controller 430 may control a second current $I_{an2}$, including a DC component and a high-frequency component, to be supplied to the motor 230 during the first period $T_{1b}$ of the motor alignment period T1 of FIG. 4 (S630). As described with reference to FIG. 4 and Equations 3 and 4, the second current $I_{an2}$ may be current corresponding to a second flux current reference value $i_{ds2}^s$, including a DC component and a high-frequency component, based on the stationary coordinate system and a second torque current reference value $i_{qs2}^s$, including a high-frequency component, based on the stationary coordinate system.

The inverter controller 430 may calculate the stator resistance and the inductance of the motor 230 based on the first current $I_{an1}$ and the second current $I_{an2}$ (S640). As described with reference to FIG. 4 and Equations 5 and 6, the inverter controller 430 may calculate the stator resistance Rs of the motor 230 based on a current reference value and a voltage reference value of the first current $I_{an1}$ and a current reference value and a voltage reference value of the second current $I_{an2}$ based on the stationary coordinate system, and calculate the inductance Ls of the motor 230 based on a current reference value and a voltage reference value of the first current $I_{an1}$ and a current reference value and a voltage reference value of the second current $I_{an2}$ based on the rotating coordinate system.

The currents including the DC components and the high-frequency components may be supplied to the motor 230 as alignment currents. Consequently, it may be possible to easily calculate the stator resistance and the inductance of the motor together with the alignment of the motor 230 at the time of starting the motor 230.

The inverter controller 430 may calculate the magnitude of a load based on the stator resistance of the motor 230 during a normal operation of the motor 230 after starting of the motor 230, and may generate a speed reference value based on the calculated magnitude of the load. As a result, it may be possible to efficiently drive the motor 230.

The motor driving apparatus may be used in various kinds of equipment. For example, the motor driving apparatus may be used in home appliances, such as a laundry treatment machine, an air conditioner, a refrigerator, a water purifier, and a cleaner. In addition, the motor driving apparatus may be used in a vehicle, a robot, a drone, etc., each of which is driven by a motor.

Figure 7:
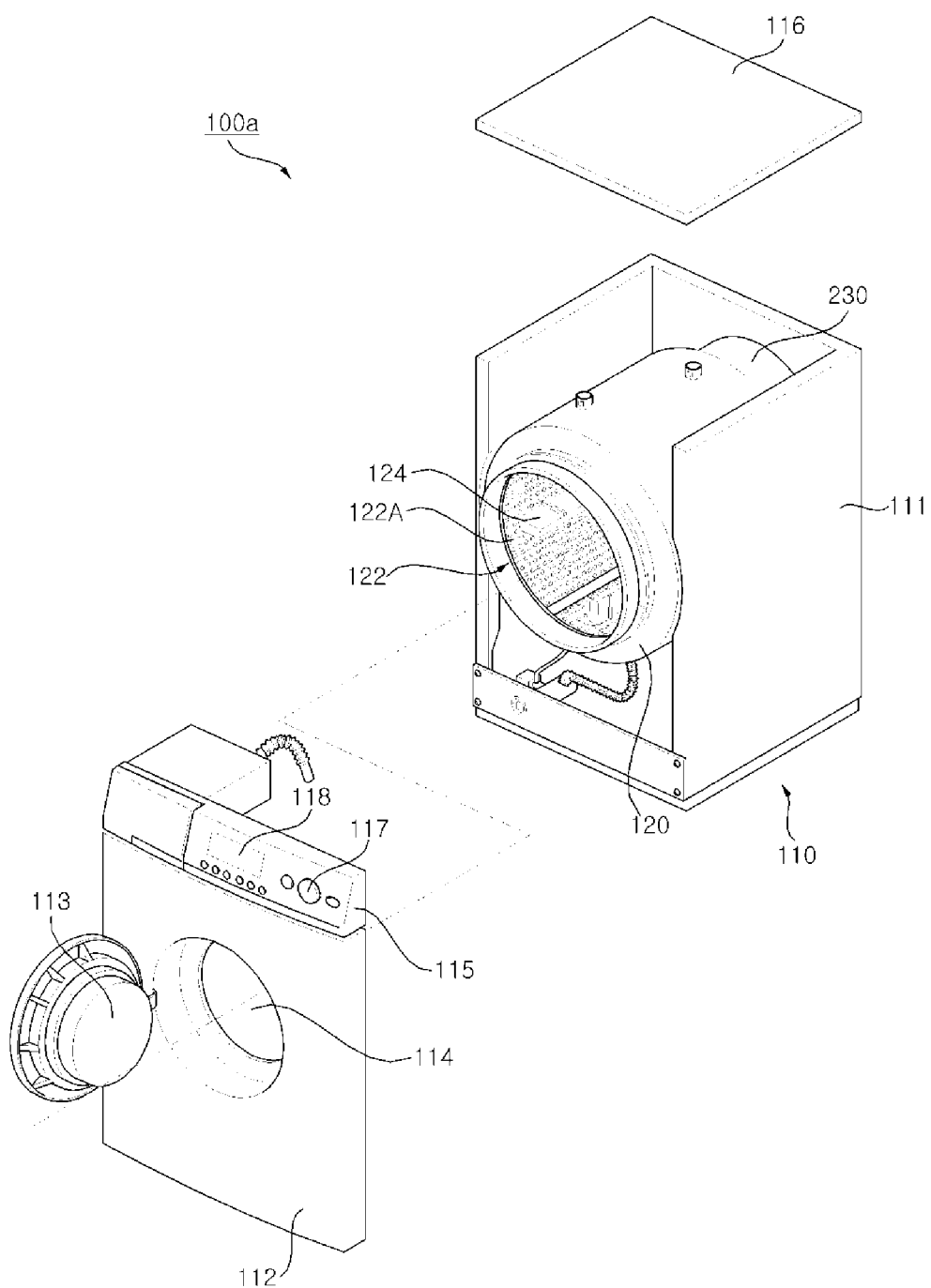
FIG. 7 is a perspective view showing a laundry treatment machine, which is an example of a home appliance according to an embodiment.

Referring to FIG. 7, a laundry treatment machine 100a may be a front load type laundry treatment machine configured such that laundry is introduced into a washing tub from the front. The front load type laundry treatment machine may include a washing machine that washes, rinses, and spin-dries laundry introduced thereinto and a drying machine that dries wet laundry introduced thereinto. Hereinafter, a description will be given based on a washing machine.

The laundry treatment machine 100a of FIG. 7, which may be a washing tub type laundry treatment machine, may include a cabinet 110 forming the external appearance of the laundry treatment machine 100a, a tub 120 provided in the cabinet 110 such that the tub 120 is supported by the cabinet 110, a washing tub 122 provided in the tub 120 for washing laundry, a motor 130 for driving the washing tub 122, a wash water supply device provided at the outside of a cabinet body 111 for supplying wash water into the cabinet 110, and a drainage device provided at the lower side of the tub 120 for draining wash water to the outside. The washing tub 122 may be provided with a plurality of through holes 122A, through which wash water flows. In addition, the washing tub 122 may be provided at the inner circumference thereof with lifters 124 for raising laundry to a predetermined height such that the laundry drops due to gravity during rotation of the washing tub 122.

The cabinet 110 may include a cabinet body 111, a cabinet cover 112 provided at the front of the cabinet body 111 in a state in which the cabinet cover 112 is coupled to the cabinet body 111, a control panel 115 provided at the upper side of the cabinet cover 112 in a state in which the control panel 115 is coupled to the cabinet body 111, and a top plate 116 provided at the upper side of the control panel 115 in a state in which the top plate 116 is coupled to the cabinet body 111.

The cabinet cover 112 may include a laundry introduction port 114, through which laundry is introduced into the washing tub 122, and a door 113 coupled to the cabinet cover 112 such that the door 113 can be turned from side to side for opening and closing the laundry introduction port 114.

The control panel 115 may include manipulation keys 117 for allowing a user to manipulate an operation state of the laundry treatment machine 100a, and a display 118 disposed at one side of the manipulation keys 117 for displaying the operation state of the laundry treatment machine 100a. The manipulation keys 117 and the display 118 of the control panel 115 may be electrically connected to a controller. The controller may electrically control the respective components of the laundry treatment machine 100a. The operation of the controller will be described hereinafter.

The washing tub 122 may be provided with an automatic balancer. The automatic balancer may reduce vibration of the washing tub 122 due to eccentricity of laundry received in the washing tub 122. A liquid balancer or a ball balancer may be used as the automatic balancer. The laundry treatment machine 100a may further include a vibration sensor for measuring the vibration of the washing tub 122 or the cabinet 110.

Figure 8:
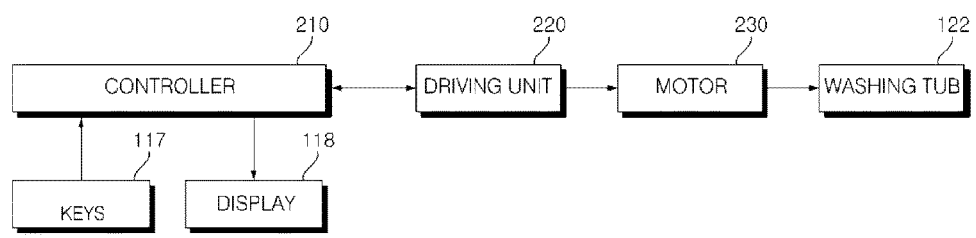
FIG. 8 is an internal block diagram of the laundry treatment machine of FIG. 7.

Referring to FIG. 8, a driving unit (or driving device) 220 of the laundry treatment machine 100a may be controlled by a controller 210. The driving unit 220 may drive the motor 230. As a result, the washing tub 122 may be rotated by the motor 230.

The controller 210 may be operated according to an operation signal from the manipulation keys 117. As a result, washing, rinsing, and spin-drying cycles of the laundry treatment machine 100a may be carried out. The controller 210 may control the display 118 to display a washing course, a washing time, a spin-drying time, a rinsing time, or a current operation state.

The controller 210 may control the driving unit 220 to operate the motor 230. A position sensing unit for sensing the position of a rotor of the motor may not be provided at the inside or the outside of the motor 230. The driving unit 220 may control the motor 230 in a sensorless mode.

The driving unit 220 may be configured to drive the motor 230. The driving unit 220 may include an inverter, an inverter controller, an output current detection unit E (see FIG. 2) for detecting output current $i_o$ flowing in the motor 230, and an output voltage detection unit F (see FIG. 2) for detecting output voltage $V_o$ applied to the motor 230. The driving unit 220 may further include a converter for supplying a DC voltage to be input the inverter (not shown). An inverter controller 430 (see FIG. 2) of the driving unit 220 may estimate the position of the rotor of the motor 230 based on the output current $i_o$ and the output voltage $V_o$, and control the motor 230 to be rotated based on the estimated position of the rotor.

The inverter controller 430 (see FIG. 2) may generate a PWM-based switching control signal $S_{ic}$ (see FIG. 2) based on the output current $i_o$ and the output voltage $V_o$, and output the generated switching control signal $S_{ic}$ to the inverter. The inverter may perform a high-speed switching operation to supply an AC voltage of a predetermined frequency to the motor 230. The motor 230 may be rotated by the AC voltage of the predetermined frequency. The driving unit 220 may correspond to the motor driving apparatus 220 of FIG. 1.

The controller 210 may sense laundry quantity based on the output current $i_o$ flowing in the motor 230. The controller 210 may sense the laundry quantity based on a current value $i_o$ of the motor 230 during the rotation of the washing tub 122. The controller 210 may precisely sense the laundry quantity based on the stator resistance value and the inductance value of the motor measured during the motor alignment period at the time of sensing the laundry quantity.

The controller 210 may sense eccentric quantity of the washing tub 122, i.e. unbalance (UB) of the washing tub 122. The eccentric quantity of the washing tub 122 may be sensed based on a ripple component of the output current $i_o$, which flows in the motor 230, or based on change quantity of rotational speed of the washing tub 122. The controller 210 may precisely sense the eccentric quantity of the washing tub 122 based on the stator resistance value and the inductance value of the motor measured during the motor alignment period at the time of sensing the laundry quantity.

Figure 9:
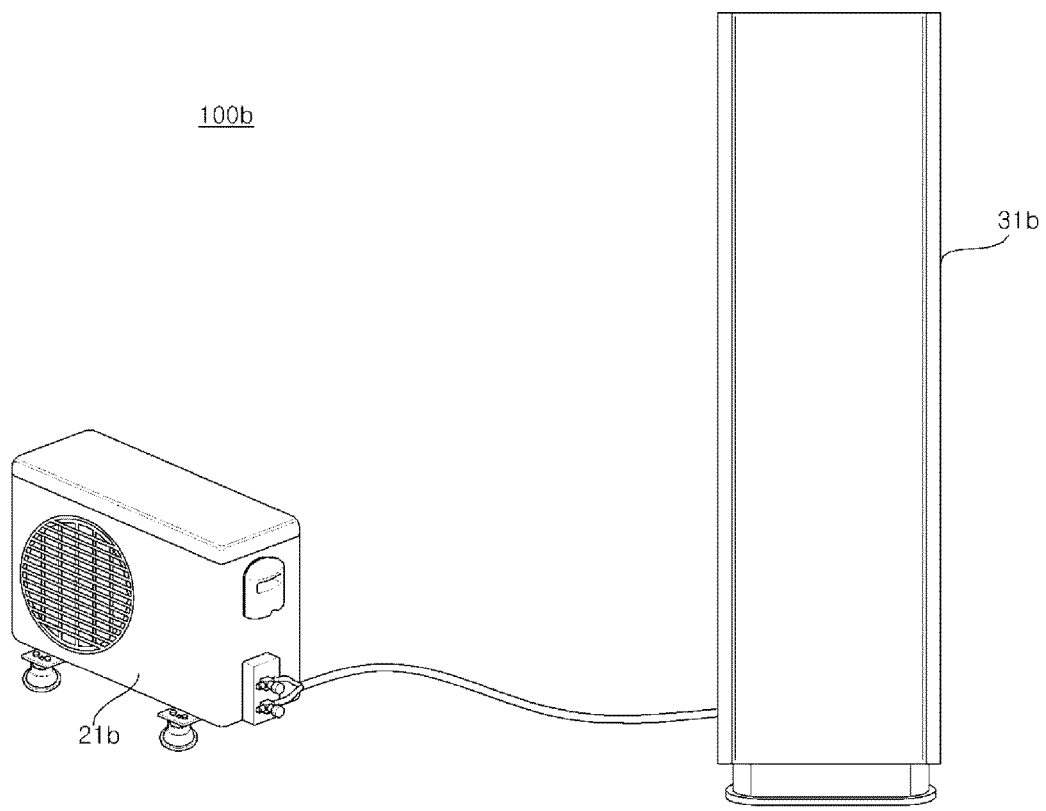
FIG. 9 illustrates the construction of an air conditioner, which is another example of the home appliance according to the embodiment.

As shown in FIG. 9, an air conditioner 100b may include an indoor unit (or indoor device) 31b and an outdoor unit (or outdoor device) 21b, which is connected to the indoor unit 31b. A stand type indoor unit, a wall mount type indoor unit, or a ceiling type indoor unit may be used as the indoor unit 31b of the air conditioner 100b. In this embodiment, the stand type indoor unit may be used as the indoor unit 31b of the air conditioner 100b. The air conditioner 100b may include at least one selected from among a ventilator, an air purifier, a humidifier, and a heater, which may be operatively connected to the indoor unit 31b and the outdoor unit 21b.

The outdoor unit 21b may include a compressor for compressing a refrigerant, an outdoor heat exchanger for performing heat exchange between the refrigerant and outdoor air, an accumulator for extracting a gas refrigerant component from the refrigerant and supplying the extracted gas refrigerant component to the compressor, and a four-way valve for changing a flow channel of the refrigerant based on a heating operation. The outdoor unit 21 may further include a plurality of sensors, a valve, and an oil collector, descriptions of which will be omitted.

The compressor and the outdoor heat exchanger of the outdoor unit 21b may be operated to compress the refrigerant or perform heat exchange with the refrigerant based on set conditions and to supply the compressed refrigerant or the heat-exchanged refrigerant to the indoor unit 31b. The outdoor unit 21b may be driven according to demand of the indoor unit 31 or a remote controller. The cooling/heating capacity of the air conditioner may be changed based on the driving of the indoor unit. Consequently, it may be possible to change the number of outdoor units that are driven and the number of compressors that are driven.

The outdoor unit 21b may supply the compressed refrigerant to the indoor unit 31b, to which the outdoor unit 21b is connected. The indoor unit 31b may receive the refrigerant from the outdoor unit 21b and discharge cool air or hot air into a room in which the indoor unit 31b is installed. The indoor unit 31b may include an indoor heat exchanger, an indoor fan, an expansion valve for expanding the refrigerant, and a plurality of sensors (not shown).

The outdoor unit 21b and the indoor unit 31b may be connected to each other via a communication cable such that the outdoor unit 21b and the indoor unit 31b can transmit and receive data to and from each other. The outdoor unit 21b and the indoor unit 31b may be connected to the remote controller in a wired or wireless fashion such that the outdoor unit 21b and the indoor unit 31b can be operated according to control of the remote controller.

The remote controller may be connected to the indoor unit 31b for allowing a user to input a control command for controlling the indoor unit 31b and for receiving and displaying information about the state of the indoor unit 31b. At this time, the remote controller may communicate with the indoor unit 31 in a wired or wireless fashion based on the type of connection between the remote controller and the indoor unit 31b.

Figure 10:
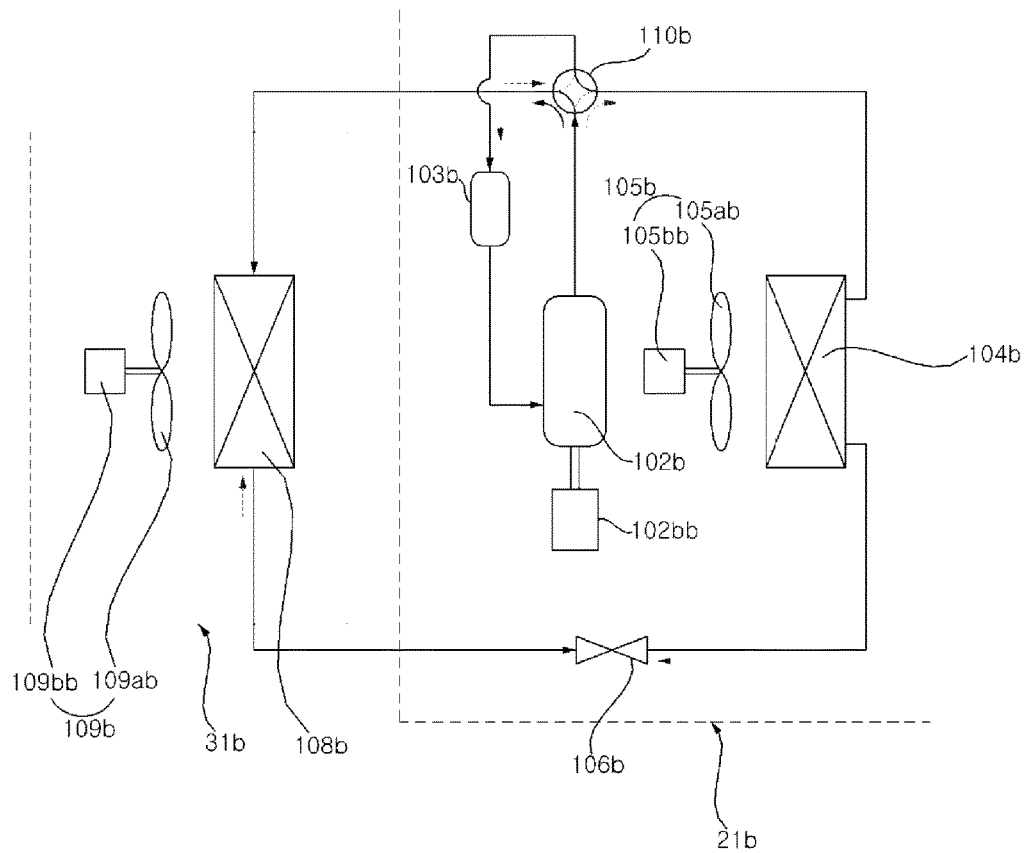
FIG. 10 is a schematic view of an outdoor unit and an indoor unit shown in FIG. 9.

Referring to FIG. 10, the air conditioner 100b may be generally divided into the indoor unit 31b and the outdoor unit 21b. The outdoor unit 21b may include a compressor 102b for compressing a refrigerant, a compressor motor 102bb for driving the compressor 102b, an outdoor heat exchanger 104b for dissipating the compressed refrigerant, an outdoor blower 105b including an outdoor fan 105ab provided at one side of the outdoor heat exchanger 104b for accelerating dissipation of the refrigerant and an outdoor fan motor 105bb for rotating the outdoor fan 105ab, an expansion device 106b for expanding the condensed refrigerant, a cooling/heating switching valve 110b for changing a flow channel of the compressed refrigerant, and an accumulator 103b for temporarily storing the gaseous refrigerant to remove moisture and foreign matter from the refrigerant and for supplying the refrigerant to the compressor 102b under predetermined pressure.

The indoor unit 31b may include an indoor heat exchanger 108b provided in a room for performing a cooling/heating function, and an indoor blower 109b including an indoor fan 109ab provided at one side of the indoor heat exchanger 108b for accelerating dissipation of the refrigerant and an indoor fan motor 109bb for rotating the indoor fan 109ab. At least one indoor heat exchanger 108b may be provided. At least one selected from an inverter compressor and a constant speed compressor may be used as the compressor 102b.

The air conditioner 100b may be configured as a cooler for cooling the room, or may be configured as a heat pump for selectively cooling or heating the room. The compressor 102b of the outdoor unit 21b of FIG. 9 may be driven by a motor driving unit, as shown in FIG. 1, for driving the compressor motor 102bb. Alternatively, the indoor fan 109ab or the outdoor fan 105ab may be driven by a motor driving unit, as shown in FIG. 1, for driving the indoor fan motor 109bb or the outdoor fan motor 105bb.

Figure 11:
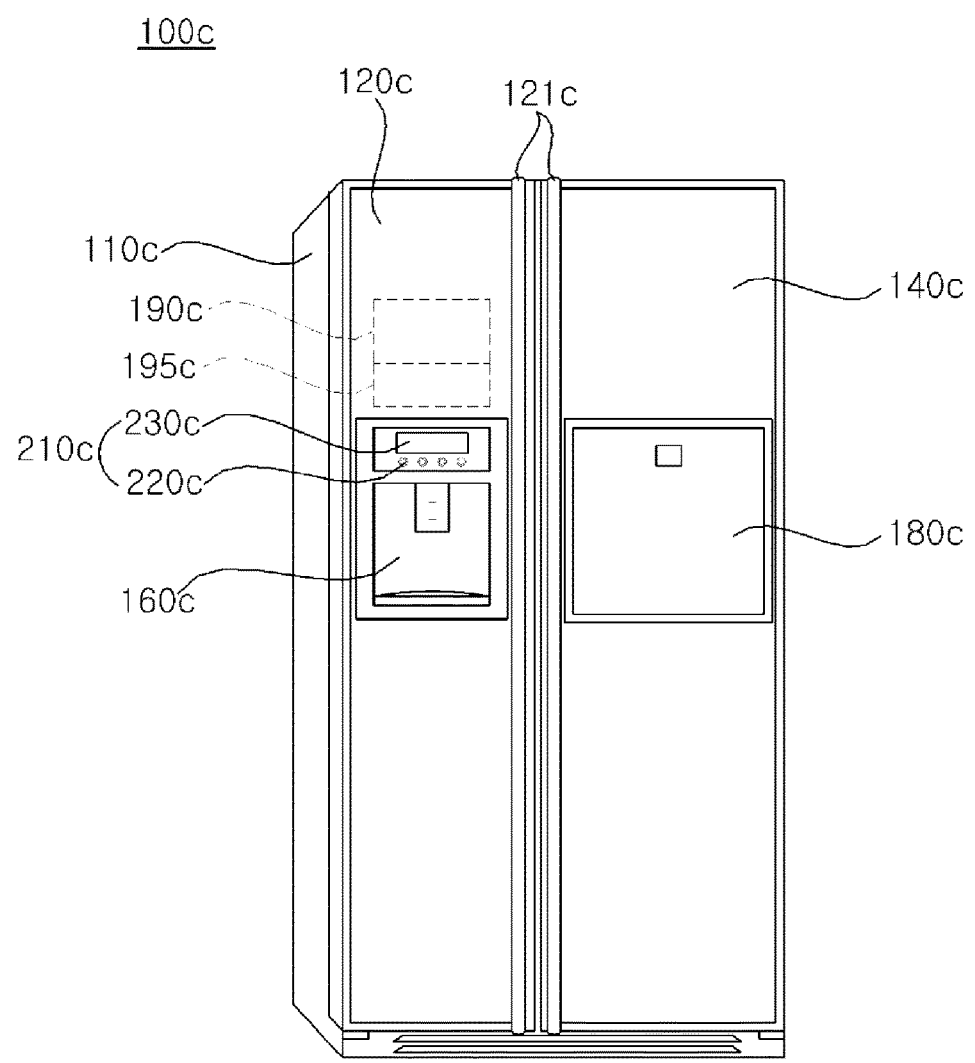
FIG. 11 is a perspective view showing a refrigerator, which is a further example of the home appliance according to the embodiment.

Referring to FIG. 11, a refrigerator 100c may include a case 110c having an internal space divided into a freezing compartment and a refrigerating compartment, a freezing compartment door 120c for opening and closing the freezing compartment, and a refrigerating compartment door 140c for opening and closing the refrigerating compartment, by which the external appearance of the refrigerator 100c is generally defined. The freezing compartment door 120c may be provided at the front of the freezing compartment with a door handle 121c, which protrudes forward. In addition, the refrigerating compartment door 140c may be provided at the front of the refrigerating compartment with another door handle 121c, which protrudes forward. Consequently, it may be possible for a user to easily turn the freezing compartment door 120c or the refrigerating compartment door 140c in order to open or close the freezing compartment door 120c or the refrigerating compartment door 140c while holding the door handle 121c provided at the freezing compartment door 120c or the door handle 121c provided at the refrigerating compartment door 140c.

The refrigerating compartment door 140c may be further provided at the front of the refrigerating compartment with a home bar 180c, which allows the user to easily take foods, such as beverages, stored in the refrigerating compartment, out of the refrigerating compartment therethrough without opening the refrigerating compartment door 140c. The freezing compartment door 120c may be further provided at the front of the freezing compartment with a dispenser 160c, which allows the user to easily take ice or drinking water, stored in the freezing compartment, out of the freezing compartment therethrough without opening the freezing compartment door 120c. A control panel 210c for controlling the operation of the refrigerator 100c and displaying an operation state of the refrigerator 100c may be provided at the upper side of the dispenser 160c.

In this embodiment, the dispenser 160c may be disposed at the front of the freezing compartment door 120c, as shown in the figure. However, the dispenser 160c may be disposed at the front of the refrigerating compartment door 140c.

An ice maker 190c for making ice from water supplied thereto using cool air in the freezing compartment may be further provided in the freezing compartment at the upper part thereof, and an ice bank 195c for storing ice made by the ice maker 190c may be further provided in the freezing compartment. An ice chute for guiding the ice stored in the ice bank 195c such that the ice drops to the dispenser 160c may be further provided in the freezing compartment.

The control panel 210c may include an input unit (or input) 220c including a plurality of buttons and a display 230c for displaying a control screen and an operation state of the refrigerator 100c. The display 230c may display information, such as a control screen, an operation state of the refrigerator 100c, and the temperature in the refrigerator 100c. The display 230c may display the service type of the dispenser (ice cubes, water, crushed ice, or the like), a set temperature in the freezing compartment, and a set temperature in the refrigerating compartment.

A liquid crystal display (LCD), a light emitting diode (LED), or an organic light emitting diode (OLED) may be used as the display 230c. In addition, a touchscreen, which is also capable of functioning as the input unit 220c, may be used as the display 230c.

The input unit 220c may include a plurality of manipulation buttons. For example, the input unit 220c may include a dispenser setting button for setting the service type of the dispenser (ice cubes, water, crushed ice, or the like), a freezing compartment temperature setting button for setting the temperature in the freezing compartment, and a refrigerating compartment temperature setting button for setting the temperature in the refrigerating compartment. A touchscreen, which is also capable of functioning as the display 230c, may be used as the input unit 220c.

The refrigerator may be a double door type refrigerator, as shown in the figure. However, the refrigerator may be a one door type refrigerator, a sliding door type refrigerator, or a curtain door type refrigerator.

Figure 12:
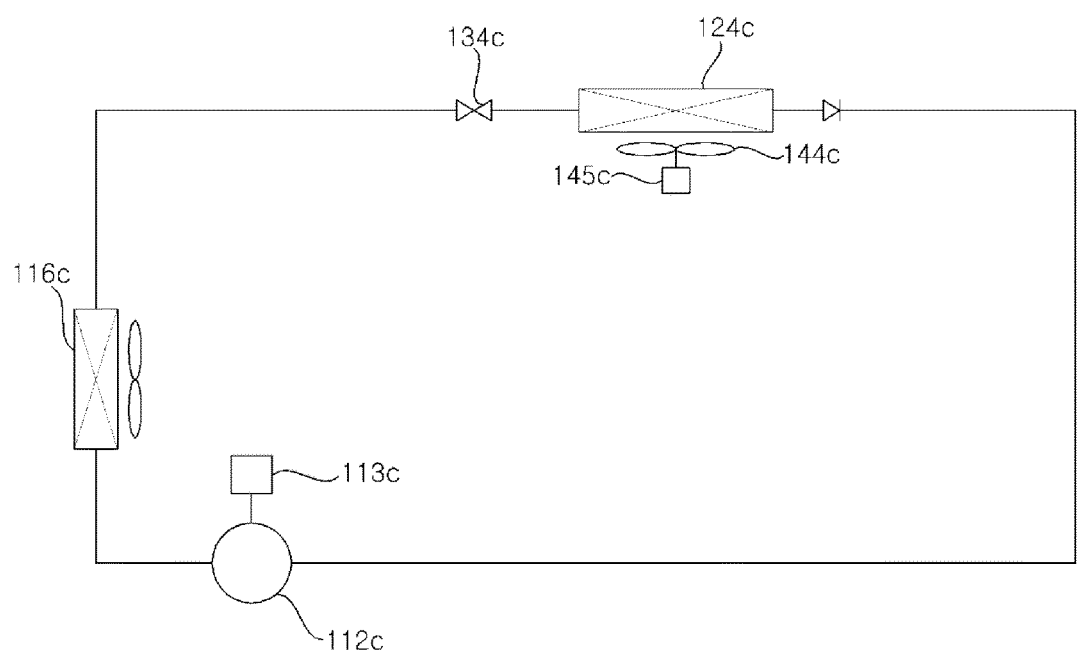
FIG. 12 is a schematic view showing the construction of the refrigerator of FIG. 11.

Referring to FIG. 12, the refrigerator 100c may include a compressor 112c, a condenser 116c for condensing a refrigerant compressed by the compressor 112c, a freezing compartment evaporator 124c provided in the freezing compartment for evaporating the refrigerant condensed by the condenser 116c, and a freezing compartment expansion valve 134c for expanding the refrigerant to be supplied to the freezing compartment evaporator 124c. A single evaporator may be used, or evaporators may be used for the refrigerating compartment and the freezing compartment separately.

The refrigerator 100c may further include a refrigerating compartment evaporator provided in the refrigerating compartment, a three-way valve for supplying the refrigerant condensed by the condenser 116c to the refrigerating compartment evaporator or to the freezing compartment evaporator 124c, and a refrigerating compartment expansion valve for expanding the refrigerant to be supplied to the refrigerating compartment evaporator. The refrigerator 100c may further include a gas and liquid separator for separating the refrigerant having passed through the freezing compartment evaporator 124c into a liquid refrigerant and a gaseous refrigerant.

The refrigerator 100c may further include a refrigerating compartment fan for suctioning cool air having passed through the freezing compartment evaporator 124c and blowing the suctioned cool air to the refrigerating compartment and a freezing compartment fan 144c for suctioning cool air having passed through the freezing compartment evaporator 124c and blowing the suctioned cool air to the freezing compartment. The refrigerator 100c may further include a compressor driving unit 113c for driving the compressor 112c, a refrigerating compartment fan driving unit for driving the refrigerating compartment fan, and a freezing compartment fan driving unit 145c for driving the freezing compartment fan 144c.

The evaporator 124c may be commonly used for the refrigerating compartment and the freezing compartment, as shown in the figure. In this case, a damper may be provided between the refrigerating compartment and the freezing compartment, and a fan may forcibly blow cool air generated by a single evaporator into both the refrigerating compartment and the freezing compartment.

The compressor 112c of FIG. 12 may be driven by a motor driving unit, as shown in FIG. 1, for driving the compressor motor. Alternatively, the refrigerating compartment fan or the freezing compartment fan 144c may be driven by a motor driving unit, as shown in FIG. 1, for driving a refrigerating compartment fan motor or a freezing compartment fan motor.

The motor driving apparatus and the home appliance including the same may not be limitedly applied to the construction and method of the embodiments as previously described; however, all or some of the embodiments may be selectively combined to achieve various modifications. The motor driving method or the operation method of the home appliance may be realized as code, which is readable by a processor included in the motor driving apparatus or the home appliance, in recording media readable by the processor. The recording media readable by the processor includes all kinds of recording devices for storing data which are readable by the processor.

As is apparent from the above description, a motor driving apparatus and a home appliance including the same may include a motor, an inverter to convert a DC voltage into an AC voltage through a switching operation and to output the AC voltage to the motor, and a controller to control the inverter, wherein, at the time of starting the motor, the controller controls a first current, comprising a DC component and a high-frequency component, to be supplied to the motor during a first period for alignment of the motor, controls a second current, comprising a DC component and a high-frequency component, to be supplied to the motor during a second period for alignment of the motor, and calculates the stator resistance and inductance of the motor based on the first current and the second current. Consequently, it may be possible to easily calculate the stator resistance and inductance of the motor during the alignment of the motor.

Current including a DC component and a high-frequency component may be supplied as an alignment current. At the time of starting the motor, therefore, it is possible to easily calculate the stator resistance and inductance of the motor together with alignment of the motor.

The controller may calculate the magnitude of a load based on the stator resistance of the motor during a normal operation of the motor after starting of the motor, and generate a speed reference value based on the calculated magnitude of the load. Consequently, it may be possible to efficiently drive the motor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

It is an object of the disclosure to provide a motor driving apparatus that is capable of easily calculating the stator resistance and inductance of a motor during the alignment of the motor and a home appliance including the same.

A motor driving apparatus may include an inverter to convert a direct current (DC) voltage into an alternating current (AC) voltage through a switching operation and to output the AC voltage to a motor, an output current detection unit to detect an output current flowing in the motor, and a controller to control the inverter, wherein, at the time of starting the motor, the controller controls a first current, including a DC component and a high-frequency component, to be supplied to the motor during a first period for alignment of the motor, and controls a second current, including a DC component and a high-frequency component, to be supplied to the motor during a second period for alignment of the motor, and the controller calculates the stator resistance and inductance of the motor based on the first current and the second current.

A home appliance may include a motor, an inverter to convert a DC voltage into an AC voltage through a switching operation and to output the AC voltage to the motor, an output current detection unit to detect an output current flowing in the motor, and a controller to control the inverter, wherein, at the time of starting the motor, the controller controls a first current, including a DC component and a high-frequency component, to be supplied to the motor during a first period for alignment of the motor, and controls a second current, including a DC component and a high-frequency component, to be supplied to the motor during a second period for alignment of the motor, and the controller calculates the stator resistance and inductance of the motor based on the first current and the second current.

A laundry treatment machine may include a washing tub, a motor for rotating the washing tub, an inverter to convert a DC voltage into an AC voltage through a switching operation and to output the AC voltage to the motor, an output current detection unit to detect an output current flowing in the motor, and a controller to control the inverter, wherein, at the time of starting the motor, the controller controls a first current, including a DC component and a high-frequency component, to be supplied to the motor during a first period for alignment of the motor, and controls a second current, including a DC component and a high-frequency component, to be supplied to the motor during a second period for alignment of the motor, and the controller calculates the stator resistance and inductance of the motor based on the first current and the second current.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor driving apparatus comprising:
   an inverter to convert a direct current (DC) voltage into an alternating current (AC) voltage through a switching operation and to output the AC voltage to a motor;
   an output current detector to detect an output current flowing in the motor; and
   a controller to control the inverter, wherein a first current having a first DC component and a high-frequency component current is supplied to the motor during a first period for alignment of the motor, and a second current having a second DC component and a second high-frequency component is supplied to the motor during a second period after the first period for alignment of the motor, and wherein a stator resistance and inductance of the motor based on the first current and the second current is determined,
   wherein the stator resistance of the motor is calculated based on values obtained by removing the first and second high-frequency components from the first current and the second current, and the inductance of the motor is calculated based on values obtained by removing the first and second DC components from the first current and the second current.

2. The motor driving apparatus according to claim 1, wherein the stator resistance and the inductance are determined during an initial start of the motor.

3. The motor driving apparatus according to claim 1, wherein the first current, including a first flux current having the first DC component and a third high-frequency component based on a stationary coordinate system, and a first torque current, having a forth high-frequency component based on the stationary coordinate system is supplied to the motor during the first period, and the second current, including a second flux current having the second DC component and a fifth high-frequency component based on the stationary coordinate system, and a second torque current having a sixth high-frequency component based on the stationary coordinate system is supplied to the motor during the second period,
   wherein the first high-frequency component includes the third high-frequency component and the fourth high-frequency component,
   wherein the second high-frequency component includes the fifth high-frequency component and the sixth high-frequency component.

4. The motor driving apparatus according to claim 3, wherein a magnitude of the second flux current is higher than a magnitude of the first flux current by an integer ratio, and a magnitude of the second torque current is higher than a magnitude of the first torque current by an integer ratio.

5. The motor driving apparatus according to claim 1, wherein the stator resistance of the motor is calculated based on a current reference value and a voltage reference value of the first current and a current reference value and a voltage reference value of the second current based on a stationary coordinate system, and the inductance of the motor is calculated based on a current reference value and a voltage reference value of the first current and a current reference value and a voltage reference value of the second current based on a rotating coordinate system.

6. The motor driving apparatus according to claim 1, further including:
   a converter to convert the AC voltage into the DC voltage;
   a capacitor to store a DC terminal voltage applied between output terminals of the converter; and
   a DC terminal voltage detector to detect the DC terminal voltage.

7. The motor driving apparatus according to claim 1, wherein the controller accelerates the motor after alignment of the motor, and varies the speed of the motor after acceleration of the motor.

8. The motor driving apparatus according to claim 1, wherein a magnitude of a load is calculated based on the stator resistance of the motor during a normal operation of the motor after starting of the motor, and a speed reference value is generated based on the calculated magnitude of the load.

9. The motor driving apparatus according to claim 8, wherein the controller includes:
   a speed calculator to calculate a rotor speed of the motor based on the detected output current;
   a current reference generator to generate a current reference value based on the calculated rotor speed of the motor and the speed reference value;
   a voltage reference generator to generate a voltage reference value based on the current reference value and the detected output current; and
   a switching control signal output device to output a switching control signal for driving the inverter based on the voltage reference value.

10. A home appliance comprising:
    a motor;
    an inverter to convert a DC voltage into an AC voltage through a switching operation and to output the AC voltage to the motor;
    an output current detector to detect an output current flowing in the motor; and
    a controller to control the inverter, wherein during a time of starting the motor, a first current including a first DC component and a first high-frequency component is supplied to the motor during a first period for alignment of the motor, and a second current including a second DC component and a second high-frequency component is supplied to the motor during a second period after the first period for alignment of the motor, and wherein a stator resistance and inductance of the motor based on the first current and the second current is determined,
    wherein the stator resistance of the motor is calculated based on values obtained by removing the first and second high-frequency components from the first current and the second current, and the inductance of the motor is calculated based on values obtained by removing the first and second DC component from the first current and the second current.

11. The home appliance according to claim 10, wherein the first current, including a first flux current having the first DC component and a third high-frequency component based on a stationary coordinate system, and a first torque current having a fourth high-frequency component based on the stationary coordinate system is supplied to the motor during the first period, and the second current, including a second flux current having the second DC component and a fifth high-frequency component based on the stationary coordinate system, and a second torque current having a sixth high-frequency component based on the stationary coordinate system is supplied to the motor during the second period, wherein the first high-frequency component includes the third high-frequency component and the fourth high-frequency component, wherein the second high-frequency component includes the fifth high-frequency component and the sixth high-frequency component.

12. The home appliance according to claim 11, wherein a magnitude of the second flux current is higher than a magnitude of the first flux current by an integer ratio, and a magnitude of the second torque current is higher than a magnitude of the first torque current by an integer ratio.

13. The home appliance according to claim 10, wherein the stator resistance of the motor is calculated based on a current reference value and a voltage reference value of the first current and a current reference value and a voltage reference value of the second current based on a stationary coordinate system, and the inductance of the motor is calculated based on a current reference value and a voltage reference value of the first current and a current reference value and a voltage reference value of the second current based on a rotating coordinate system.

14. The home appliance according to claim 10, further including:

a converter to convert the AC voltage into the DC voltage;

a capacitor to store a DC terminal voltage applied between output terminals of the converter; and a DC terminal voltage detector to detect the DC terminal voltage.

15. The home appliance according to claim 10, wherein the controller accelerates the motor after alignment of the motor, and varies the speed of the motor after acceleration of the motor.

16. The home appliance according to claim 10, wherein a magnitude of a load is calculated based on the stator resistance of the motor during a normal operation of the motor after starting of the motor, and a speed reference value is generated based on the calculated magnitude of the load.

17. The home appliance according to claim 16, wherein the controller includes:

a speed calculator to calculate a rotor speed of the motor based on the detected output current;

a current reference generator to generate a current reference value based on the calculated rotor speed of the motor and the speed reference value;

a voltage reference generator to generate a voltage reference value based on the current reference value and the detected output current; and a switching control signal output device to output a switching control signal for driving the inverter based on the voltage reference value.

18. A laundry treatment machine comprising:

a washing tub;

a motor for rotating the washing tub;

an inverter to convert a DC voltage into an AC voltage through a switching operation and to output the AC voltage to the motor;

an output current detector to detect an output current flowing in the motor; and a controller to control the inverter, wherein during a time of starting the motor, the controller controls a first current including a first DC component and a first high-frequency component to be supplied to the motor during a first period for alignment of the motor, and controls a second current including a second DC component and a second high-frequency component to be supplied to the motor during a second period after the first period for alignment of the motor, and wherein a stator resistance and inductance of the motor based on the first current and the second current is determined, wherein the stator resistance of the motor is calculated based on values obtained by removing the first and second high-frequency components from the first current and the second current, and the inductance of the motor is calculated based on values obtained by removing the first and second DC components from the first current and the second current.

* * * * *